United States Patent
Polyakov (10) Patent No.: US 10,969,811 B1
(45) Date of Patent: Apr. 6, 2021

(54) STABILIZED DISCHARGE POWER SUPPLY FOR HALL-EFFECT THRUSTERS

(71) Applicant: PIPL LIMITED, Nicosia (CY)

(72) Inventor: Maxym Polyakov, Menlo Park, CA (US)

(73) Assignee: PIPL LIMITED, Nicosia (CY)

( * ) Notice: Subject to any disclaimer, the term of this patent is extended or adjusted under 35 U.S.C. 154(b) by 0 days.

(21) Appl. No.: 17/131,807

(22) Filed: Dec. 23, 2020

(51) Int. Cl.
 G05F 1/00 (2006.01)
 G05F 1/625 (2006.01)
 B64G 1/40 (2006.01)

(52) U.S. Cl.
 CPC ............ G05F 1/625 (2013.01); B64G 1/405 (2013.01)

(58) Field of Classification Search
 CPC .............................. G05F 1/625; B64G 1/405
 USPC ........................................................ 307/9.1
 See application file for complete search history.

(56) References Cited

U.S. PATENT DOCUMENTS

| | | | | |
|---|---|---|---|---|
| 5,266,891 A * | 11/1993 | Kumar | ............... | G01R 31/34 324/750.3 |
| 2008/0048589 A1* | 2/2008 | Fukumoto | ............ | H05B 41/282 315/324 |
| 2011/0095741 A1* | 4/2011 | Huang | ................... | H02M 3/156 323/283 |
| 2014/0265935 A1* | 9/2014 | Sadwick | ................ | H05B 45/10 315/307 |
| 2016/0181930 A1* | 6/2016 | Chen | ....................... | H02M 1/36 363/21.18 |
| 2018/0085845 A1* | 3/2018 | Itzenberger | .......... | B23K 11/245 |
| 2018/0138797 A1* | 5/2018 | Tsu | ................... | H02M 3/33592 |

* cited by examiner

*Primary Examiner* — Ryan Jager
(74) *Attorney, Agent, or Firm* — Georgiy L. Khayet (57) ABSTRACT

Methods and systems for a discharge power supply for providing a stabilized discharge power to a Hall-effect thruster are provided. A method includes sensing, by a first sensor circuit and based on a discharge power, a voltage sense signal, sensing, by a second sensor circuit and based on the discharge power, a current sense signal, multiplying, by a multiplying circuit, the voltage sense signal and the current sense signal to generate a feedback signal, generating, by a control logic circuit and based on control signals, further control signals, generating, by an impulse generation circuit and based on the further control signals and the feedback signal, control impulses, producing, by a transistor bridge and using the control impulses and a power source, an electrical impulses, and modifying, by an output circuit, the electrical impulses to generate the stabilized discharge power.

20 Claims, 5 Drawing Sheets

STABILIZED DISCHARGE POWER SUPPLY FOR HALL-EFFECT THRUSTERS

TECHNICAL FIELD

This disclosure generally relates to rocket and space technology. More specifically, this disclosure relates to discharge power supplies for providing a stabilized discharge power-for Hall-effect thrusters.

BACKGROUND

Currently, stabilized voltage sources are widely used as discharge power supplies for Hall-effect thrusters. The main disadvantage of the currently used discharge power supplies is that they operate in a wide range of output parameters, from idling mode (when the discharge current is zero) to a short-circuit mode (when the discharge voltage is nearly zero). Such a wide range of changes of output parameters makes it difficult to ensure high efficiency of the discharge power sources. In addition, the currently used discharge power sources require use of high-speed devices to prevent overloading of voltage and current.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This disclosure is generally concerned with discharge power supplies for Hall-effect thrusters. The present technology may provide discharge power supplies with stabilizing output power.

According to one embodiment of this disclosure, a discharge power supply (DPS) for providing a stabilized discharge power to a Hall-effect thruster (HET) may include a first sensor circuit configured to sense, based on a discharge power, a voltage sense signal. The DPS may include a second sensor circuit configured to sense, based on the discharge power, a current sense signal. The DPS may include a multiplying circuit configured to multiply the voltage sense signal and the current sense signal to generate a feedback signal. The DPS may include a control logic circuit configured to receive control signals and generate further control signals. The DPS may include an impulse generation circuit configured to generate, based on the further control signals and the feedback signal, control impulses. The DPS may include a transistor bridge configured to produce, using the control impulses and a power source, electrical impulses. The DPS may include an output circuit configured to modify the electrical impulses-to generate the stabilized discharge power.

The output circuit may include a transformer configured to transform the electrical impulses. The output circuit may include a rectifier configured to rectify impulses of the transformed electrical impulses to produce rectified electrical impulses. The output circuit may include an output filter configured to filter the rectified electrical impulses to generate the stabilized discharge power.

The voltage sense signal can be proportional to a discharge voltage of the power supply and the current sense signal can be proportional to a discharge current of the power supply.

The DPS may include a temperature threshold sensor. The temperature threshold sensor can be configured to sense a temperature of the transformer. The temperature threshold sensor can be configured to determine whether the temperature exceeds a pre-determined threshold. The temperature threshold sensor can be configured to, in response to the determination that the temperature exceeds a pre-determined threshold, provide a fault signal to the impulse generation circuit to interrupt generation of the control impulses.

The DPS can include a first normalizing amplifier configured to amplify the voltage sense signal prior to the discharge voltage-sense signal being provided to the multiplying circuit. The DPS may include a second normalizing amplifier configured to amplify the current sense signal prior to the discharge current sense signal being provided to the multiplying circuit.

The DPS may include another temperature threshold sensor. The temperature threshold sensor can be configured to sense a temperature of a board holding at least one of the following: the first sensor circuit, the second sensor circuit, the multiplying circuit, the control logic circuit, the impulse generation circuit, the transistor bridge, and the output circuit. The temperature threshold sensor can be configured to determine that the temperature exceeds a pre-determined threshold. The temperature threshold sensor can be configured to, in response to the determination, provide a fault signal to the control logic circuit, wherein upon receiving the fault signal, the control logic circuit can interrupt generating, by the impulse generation circuit, the control impulses.

The DPS may include a voltage threshold sensor. The voltage threshold sensor can be configured to sense a voltage of the power source. The voltage threshold sensor can be configured to determine that the voltage exceeds a pre-determined threshold. The voltage threshold sensor can be configured to, in response to the determination, provide a fault signal to the control logic circuit. Upon receiving the fault signal, the control logic circuit can interrupt generating, by the impulse generation circuit, the control impulses.

The DPS may include another voltage threshold sensor. The voltage threshold sensor can be configured to determine whether the voltage sense signal exceeds a pre-determined threshold. The voltage threshold sensor can be configured to, in response to the determination that the voltage sense signal exceeds a pre-determined threshold, provide a fault signal to the multiplying circuit. Upon receiving the fault signal, the multiplying circuit can interrupt generating the feedback signal.

The DPS can include a current threshold sensor. The current threshold sensor can be configured to determine that the current sense signal exceeds a pre-determined threshold. The current threshold sensor can be configured to, in response to the determination, provide a fault signal to the multiplying circuit. Upon receiving the fault signal, the multiplying circuit can interrupt generating the feedback signal.

The control signals can be provided to the control logic circuit by a control panel of a space apparatus driven by the Hall-effect thruster. The control signals include on/off signals and a desired level of the output discharge power.

The voltage sense signal and the current sense signal are provided to a control panel of a space apparatus driven by the Hall-effect thruster. The control panel can be configured to generate, based on the voltage sense signal and the current sense signal, telemetric signal indicative of a state of the Hall-effect thruster.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure are concerned with space and rocket technology and, more specifically to a design of HET based propulsion systems. The propulsion system may include a Hall-effect thruster, a working substance storage and supply system, and a power processing unit (PPU). The PPU may provide an electrical power for all subsystems of the propulsion system, ensures starting of the HET, maintains parameters of the propulsion system in given limits, and ensures shutdown of the HET. The PPU may include a DPS. Embodiments of the present disclosure may provide a DPS with stabilizing of output discharge power. The use of a DPS having the capacity of stabilizing output power may ensure high efficiency of the DPS in a wide range of values of discharge voltages and currents.

According to an example embodiment, a DPS for providing a stabilized discharge power to a HET may include a first sensor circuit configured to sense, on the output voltage, a voltage sense signal. The DPS may include a second sensor circuit configured to sense, based on the discharge power, a current sense signal. The DPS may include a multiplying circuit configured to multiply the voltage sense signal and the current sense signal to generate a feedback signal. The DPS may include a control logic circuit configured to receive control signals and generate further control signals. The DPS may include an impulse generation circuit configured to generate, based on the further control signals and the feedback signal, control impulses. The DPS may include a transistor bridge, configured to produce, based on the control impulses and using a power source, electrical impulses. The DPS may include a transformer configured to transform the electrical impulses. The DPS may include a rectifier configured to rectify impulses of the transformed electrical impulses to produce rectified impulses. The DPS may include an output filter configured to filter the rectified impulses to generate the output discharge power.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
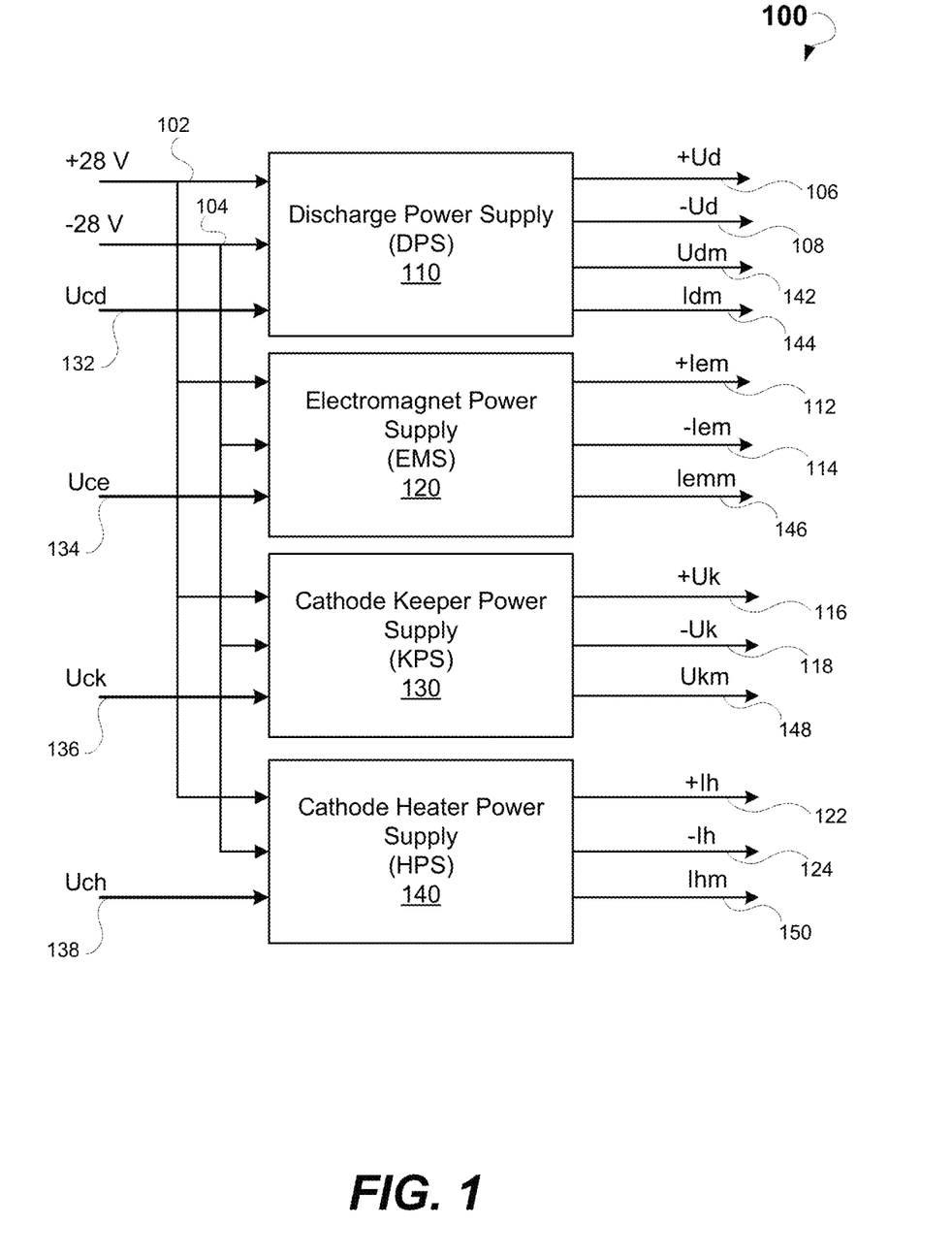
FIG. 1 is a block diagram of a power processing unit (PPU) for a HET where a discharge power supply (DPS) can be implemented, according to some example embodiment of the present disclosure.

FIG. 1 is a block diagram of a power processing unit (PPU) 100 for a HET where a discharge power supply (DPS) can be implemented, according to some example embodiment of the present disclosure. The PPU 100 may include the following power supplies: a DPS 110, an electromagnet power supply (EMS) 120, a cathode keeper power supply (KPS) 130, and a cathode heater power supply (HPS) 140.

The PPU 100 may use a spacecraft onboard power source as a primary power source. Typically, the primary power source provides +28 volts for the propulsion systems with power consumption up to 1 kilowatt and +110 volts for the propulsion systems with power consumption above 1 kilowatt.

In the FIG. 1, Ucd denotes a control signal provided to DPS 110, Uce denotes a control signal provided to EMS 120, Uck denotes a control signal provided to KPS 130, and Uch denotes a control signal provided to HPS 140. Each of the control signals Ucd, Uce, Uck, Uch may include a logical signal indicating turning the corresponding power supply on and off and an analog signal for setting a value of an output voltage, an output current, or an output power of the power supply.

Ud denotes the discharge voltage. Udm denotes a measured value of discharge voltage. Idm denotes a measured value of discharge current. Iem is a current provided to an electromagnet of HET. Iemm is a measured value of current provided to the electromagnet current. Uk is a voltage provided to a keeper of the HET. Ukm is a measured value of the voltage provided to the keeper. Ih is a current provided to a cathode heater of HET. Ihm is a measured value of the current provided to the cathode heater current. Lines 102, 104, 106, 108, 112, 114, 118, 118, 122, and 124 are electrical energy transmission lines. Lines 132, 134, 136, and 138 are lines for transmitting control signals. Lines 142, 144, 146, 148, and 150 are lines for transmitting measured values for the currents and voltages.

Figure 2:
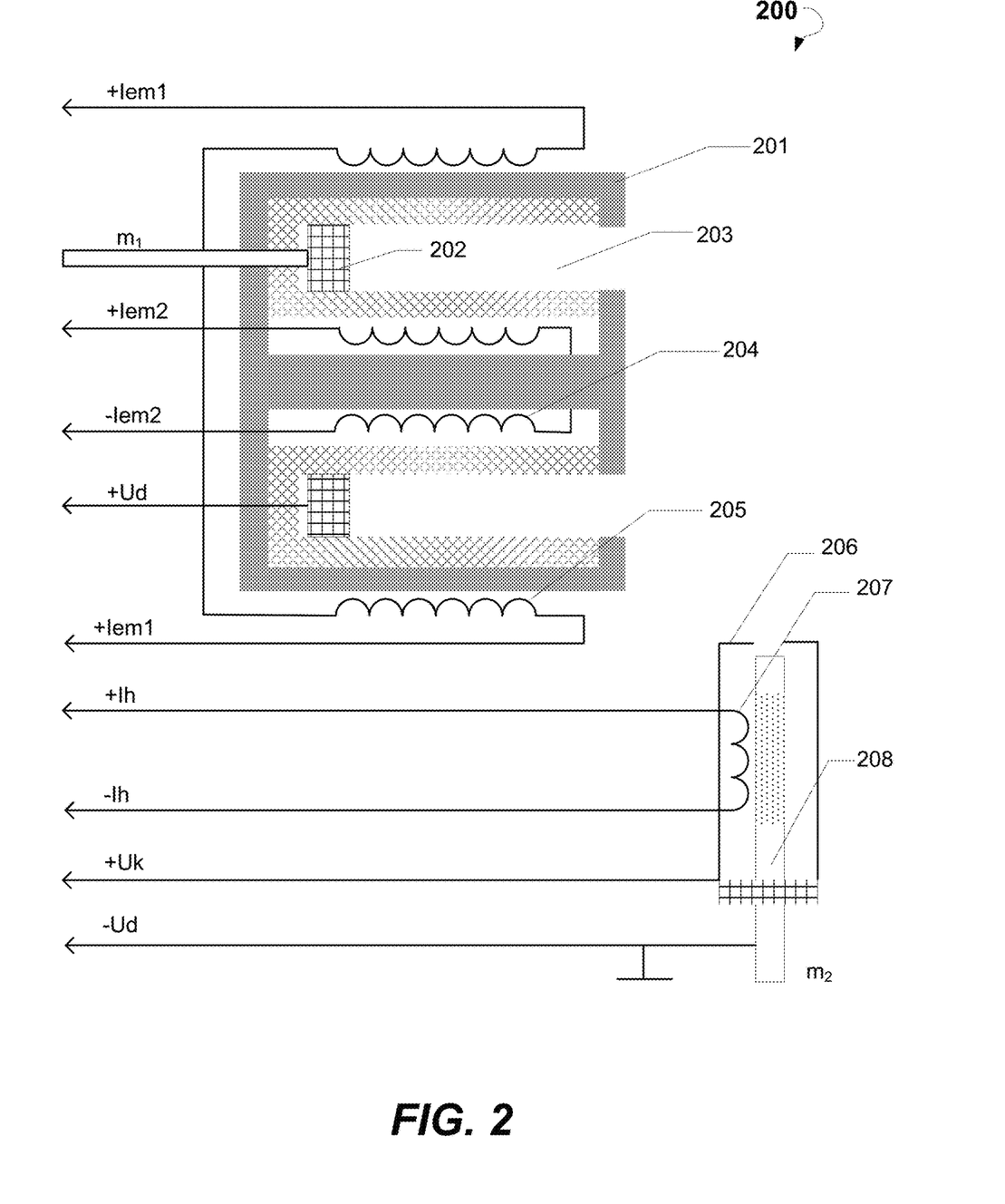
FIG. 2 is a block diagram of a HET, according to some example embodiments of the present disclosure.

FIG. 2 is a block diagram showing a HET 200 and electrical connections of HET 200 to the PPU 100, according to some example embodiments of the present disclosure. DPS 110 (shown FIG. 1) is connected to an anode 202 located in an accelerating channel 203. DPS 110 (shown FIG. 1) is also connected to a cathode 208. The HET 200 includes an internal electromagnet 204 and an external electromagnet 205. The internal electromagnet 204 and the external electromagnet 205 utilize the magnetic circuit 201 to create a radial magnetic field of a given force in the accelerating channel 203. The internal electromagnet 204 and the external electromagnet 205 are powered by the EMS 120 (shown in FIG. 1).

To ensure the operability, the cathode 208 is required to be preheated by a heater 207. The heater 207 is powered by an HPS 140 (show in FIG. 1). During starting the HET 200, the KPS 130 (shown in FIG. 1) provides ignition voltage to a cathode keeper 206.

In some embodiments, HET includes a non-heated cathode. In these embodiments, the heater 207 can excluded from the cathode 208 and the cathode 208 can be preheated using the electric power applied between the keeper 206 and the cathode 207. In these embodiments, the HPS 140 can be excluded from the PPU 100 (shown in FIG. 1).

After a discharge occurs in the accelerating channel 203 of the HET 200, the HPS 140 and KPS 130 (shown in FIG. 1) can be turned off and the cathode 208 can operate in an automatic mode.

Figure 3:
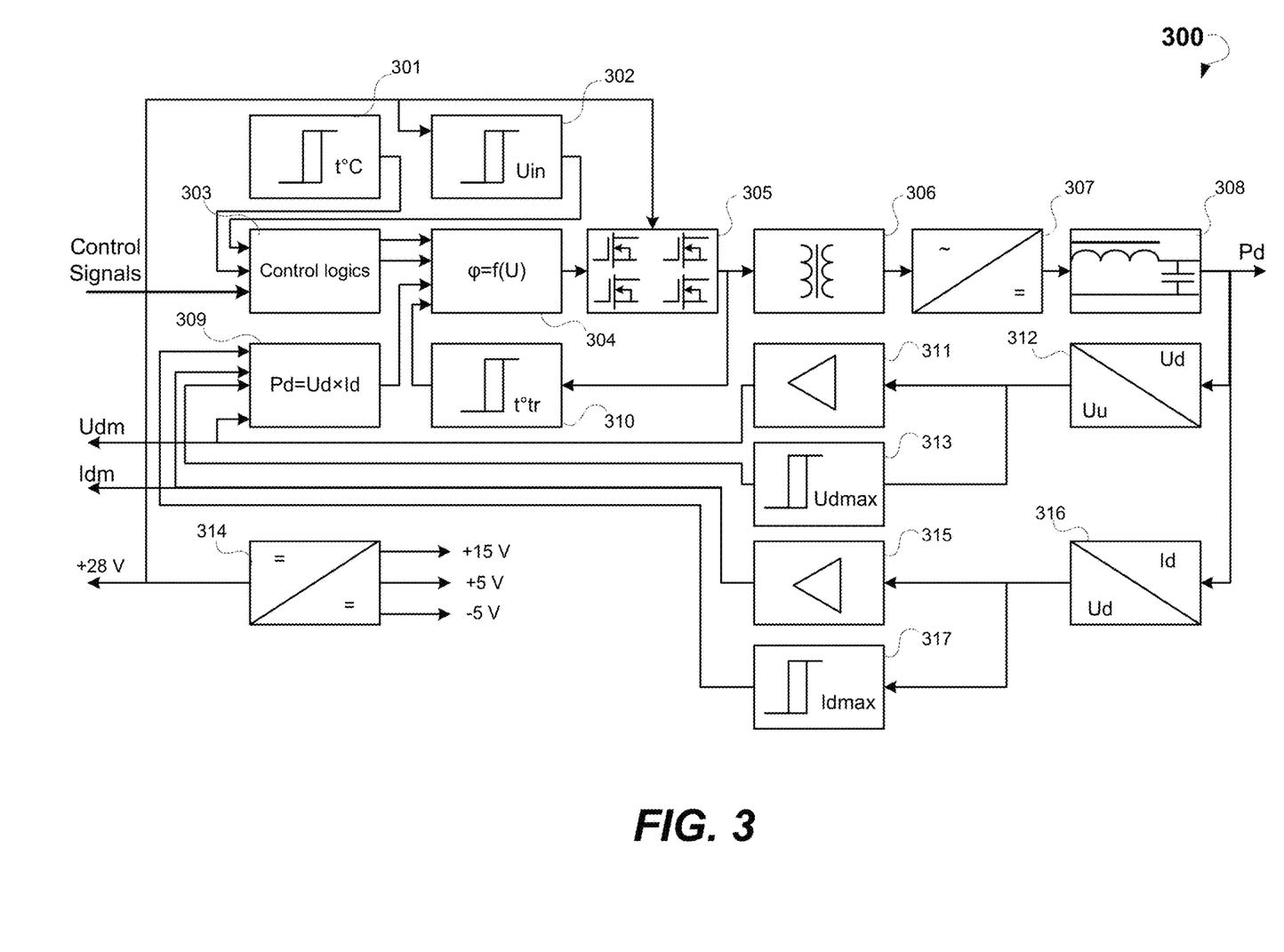
FIG. 3 is a block diagram of a DPS with stabilizing of output power, according to an example embodiment of the present disclosure.

FIG. 3 is a block diagram of DPS 300 with stabilizing power, according to an example embodiment of the present disclosure. The DPS 300 can be used as DPS 110 (shown in FIG. 1) to provide stabilized discharge power to HET 200 (shown in FIG. 2). The DPS 300 may include the following components: a temperature threshold sensor 301, a voltage threshold sensor 302, a control logic circuit 303, an impulse generation circuit 304, a transistor bridge 305, a transformer 306, a rectifier 307, an output filter 308, a multiplying circuit 309, a temperature threshold sensor 310, a first normalizing amplifier 311, a first sensor circuit 312, a voltage threshold sensor 313, a voltage generating unit 314, a second normalizing amplifier 315, a second sensor circuit 316, and a current threshold sensor 317. DPS 300 may further include a board holding the components 301-317.

The temperature threshold sensor 301 can be configured to sense a temperature of components of DPS 300. For example, temperature threshold sensor 301 may sense a temperature of the board holding the components 301-317. When the temperature exceeds a pre-determined threshold, then the temperature threshold sensor 301 may cause the control logic circuit 303 to turn DPS 300 off. For example, the control logic circuit 303 may interrupt generating, by the impulse generation circuit 304, control impulses for the transistor bridge 305. In some embodiments, the temperature threshold sensor 301 may include a Schmitt trigger.

The voltage threshold sensor 302 can be configured to control a working range of input voltage of an onboard power supply provided to the DPS 300. When the input voltage is outside pre-determined boundaries, then the voltage threshold sensor causes the control logic circuit 303 to turn DPS 300 off. In some embodiments, the voltage threshold sensor 302 may include a Schmitt trigger. The onboard voltage +28V provided to the DPS 300 is used by the voltage generating unit 314 to produce service voltages feeding the components of DPS 300.

The logic control circuit 303 can be configured to receive control signals from the temperature threshold sensor 301, voltage threshold sensor 302, and a control panel of space apparatus driven by HET 200. The logic control circuit 303 can be configured to generate control signals for the impulse generation circuit 304.

The impulse generation circuit 304 can be configured to generate, based on control signal received from the control logic circuit 303 and a feedback signal form the multiplying circuit 309, phase-shifted control impulses. The output stabilized discharge power produced by DPS 300 can be determined based on the phase shift between the control impulses.

The transistor bridge 305 can be configured to produce, using the phase-shifted control impulses and onboard power provided to the DPS 300, electrical impulses. In some embodiments, the transistor bridge 305 may include an H-bridge.

The transformer 306 can be configured to transform the electrical impulses. The rectifier 307 can be configured to rectify impulses of the transformed electrical impulses form the transformer 306 to produce rectified impulses. In some embodiments, the rectifier 307 may include a full-wave rectifier including two diodes.

The output filter 308 can be configured to filter the rectified signal to generate an output stabilized discharge power Pd. The output stabilized discharge power Pd can be further provided to HET 200.

The first sensor circuit 312 can be configured to sense, based on the discharge power Pd, a discharge voltage sense signal. The second sensor circuit 316 can be configured to sense, based on the discharge power Pd, a discharge current sense signal. The first normalizing amplifier 311 can be configured to amplify the voltage sense signal prior and provide the amplified discharge voltage Udm sense signal to the multiplying circuit 309. The second normalizing amplifier 316 can be configured to amplify the current sense signal and provide the amplified discharge current Idm sense signal to the multiplying circuit 309.

The voltage threshold sensor 313 can be configured to determine that the voltage sense signal exceeds a pre-determined threshold and, in response to the determination, ensure that the DPS 300 is turned off. For example, in response to the determination, the voltage threshold sensor 313 can provide a fault signal to the multiplying circuit 309. Upon receiving the fault signal, the multiplying circuit 309 can be configured to interrupt generating the feedback signal provided to the impulse generation circuit 304.

The current threshold sensor 317 can be configured to determine that the current sense signal exceeds a pre-determined threshold and, in response to the determination, ensure that the DPS 300 is turned off. For example, in response to the determination, the current threshold detector 317 can provide a fault signal to the multiplying circuit 309. Upon receiving the fault signal, the multiplying circuit 309 can be configured to interrupt generating the feedback signal provided to the impulse generation circuit 304.

The temperature threshold sensor 310 can be configured to sense a temperature of the transformer 306. If the temperature of the transformer 306 exceeds a pre-determined threshold, the temperature threshold sensor 310 can provide a fault signal to the impulse generation circuit 304 to interrupt generating the phase-shifted control impulses.

Stabilizing of the output discharge power Pd can be ensured by providing a negative feedback signal loop in the DPS 300, where the negative feedback signal is proportional to the output power signal Pd. The negative feedback signal can be produced by sensing voltage and current of the output discharge power Pd to obtain the voltage sense signal and the current sense signal. The voltage sense signal and the current sense signal can be amplified by the normalizing amplifier 311 and the normalizing amplifier 315, respectively. The amplified voltage sense signal can be proportional to voltage of the output discharge power Pd. The amplified current sense signal can be proportional to current of the output discharge power Pd.

The amplified voltage sense signal and amplified current sense signal can be provided to the multiplying circuit 309. The multiplying circuit 309 multiplies the amplified voltage sense signal and the amplified current sense signal and produce, based on the result of multiplication, the feedback signal proportional to the output discharge power Pd. The feedback signal can be provided to the impulse generation circuit 304. The impulse generation circuit 304 generates phase-shifted impulses to control the transistor bridge 305. The feedback signal can be used by the impulse generation circuit 304 in a negative feedback loop to stabilize the output discharge power Pd. As result, the output discharge power Pd can be stabilized at given level with a high accuracy.

The given level of the output stabilized discharge power Pd can be set by the control logic circuit 303. The control logic circuit 303 is configured to receive control signal for a control panel of space apparatus driven by HET 200.

The use of DPS 300 allows to provide a high voltage (up to 400 Volts) to anode 202 of HET 200 (shown in FIG. 2) during start of the HET 200 to ensure stability of the start. After an electric discharge occurs in the accelerating channel 203 of the HET 200 and the nominal value of the discharge current is reached (at a given value of the flow rate of the working substance through the anode 202), the discharge voltage can be automatically reduced to the nominal value. The use of a DPS with output power stabilization eliminates overloading of the onboard power supply in emergency modes of operation of HET 200.

Inventor has tested the DPS 300 with two Hall-effect thrusters ST-25 and ST-40 developed by Space Electric Thruster Systems (SETS) with maximal output power of 180 watts and 400 watts, respectively. The test showed that accuracy of stabilization of the output discharge power was at least ±3% and efficiency of DPS 300 was above 95%.

Figure 4:
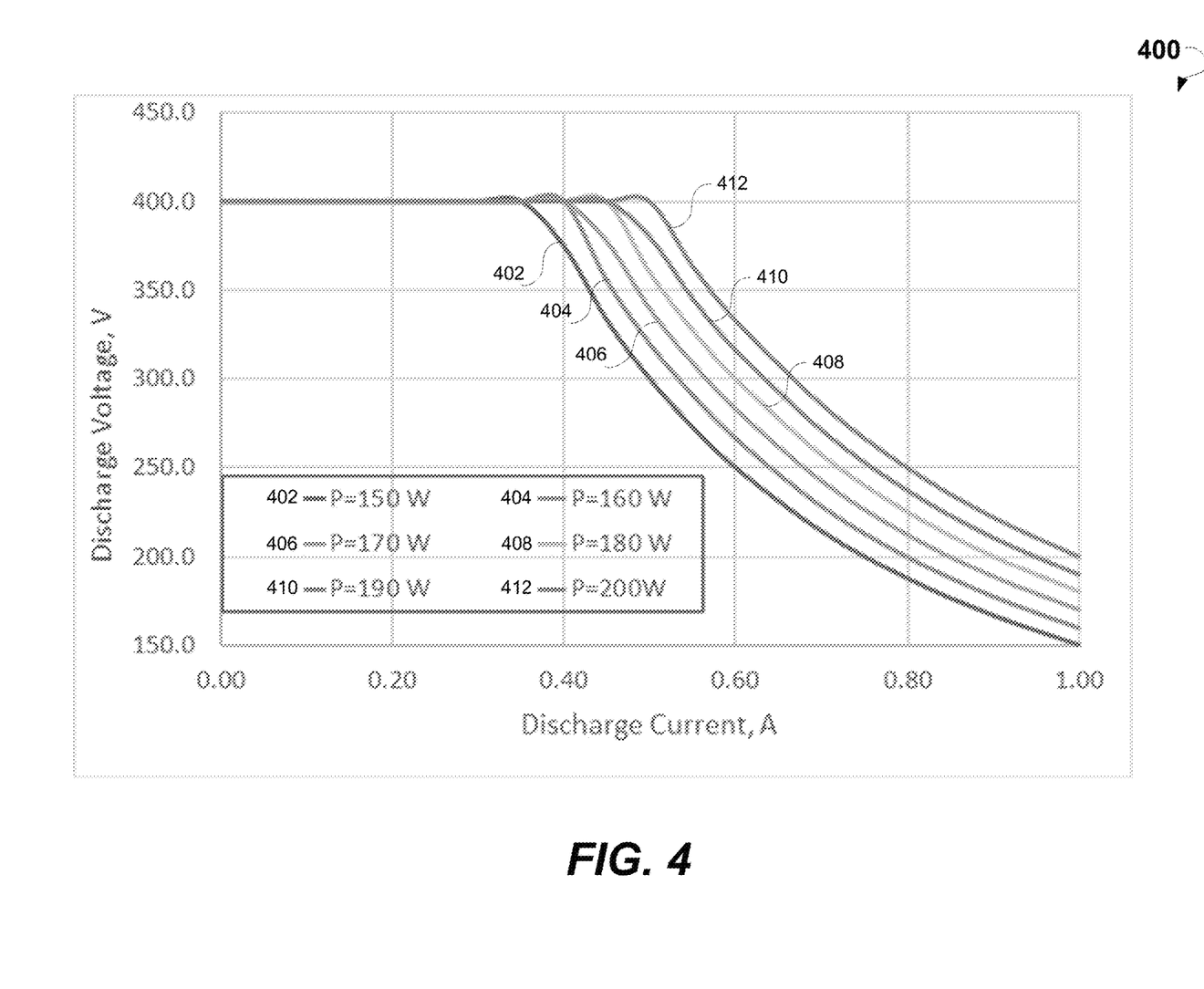
FIG. 4 is a plot of voltampere characteristics of a DPS, according to some example embodiments of the present disclosure.

FIG. 4 is a plot of voltampere characteristics of the DPS 300, according to some example embodiments of the present disclosure. The voltampere characteristics include a voltampere characteristic 402 at output discharge power of 150 watts, a voltampere characteristic 404 at output discharge power of 160 watts, a voltampere characteristic 406 at output discharge power of 170 watts, a voltampere characteristic 408 at output discharge power of 180 watts, a voltampere characteristic 410 at output discharge power of 190 watts, and a voltampere characteristic 402 at output discharge power of 200 watts.

Figure 5:
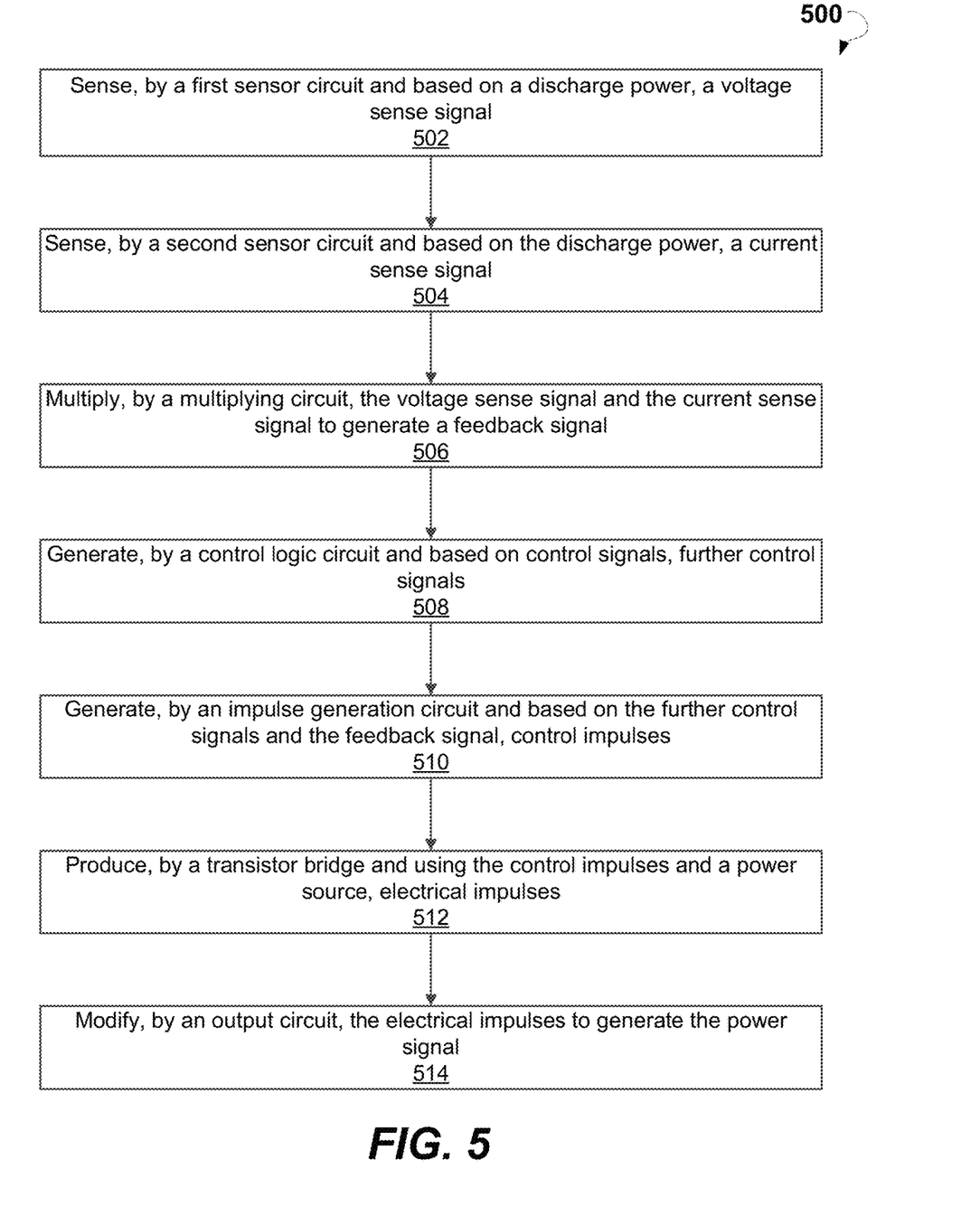
FIG. 5 is a flow chart showing a method for providing a discharge power to a Hall-effect thruster, according to an example embodiment.

FIG. 5 is a flow chart showing a method 500 for providing a stabilized discharge power to a Hall-effect thruster, according to an example embodiment. The method 500 may commence in block 502 with sensing, by a first sensor circuit and based on the output discharge power, a discharge voltage sense signal. The voltage sense signal is proportional to a voltage of the discharge power. The current sense signal can be proportional to a current of the discharge power.

In block 504, the method 500 may include sensing, by a second sensor circuit and based on the output discharge power, a discharge current sense signal. In block 5064, the method 500 may include multiplying, by a multiplying circuit, the voltage sense signal and the current sense signal to generate a feedback signal. Prior the voltage sense signal and the current sense signal are provided to the multiplying circuit; the voltage sense signal can be amplified by a first normalizing amplifier and the current sense signal can be amplified by a second normalizing amplifier.

In block 508, the method 500 may include generating, by a control logic circuit and based on control signals, further control signals. In block 510, the method 500 may include generating, by an impulse generation circuit and based on the further control signals and the feedback signal, control impulses. In block 512, the method 500 may include producing, by a transistor bridge and using the control impulses and a power source, electrical impulses. In block 514, the method 500 may include modifying, by an output circuit, the electrical impulses to generate the stabilized discharge power. The output circuit may include a transformer configured to transform the electrical impulses. The output circuit may include rectifier configured to rectify impulses of the transformed electrical signal to produce rectified impulses. The output circuit may include an output filter configured to filter the rectified impulses to generate the stabilized discharge power.

The method 500 may also include sensing, by a temperature threshold sensor, a temperature of the transformer. The method 500 may include determining, by the temperature threshold sensor, that the temperature exceeds a pre-determined threshold. In response to the determination, the method 500 may include providing, by the temperature threshold sensor, a fault signal to the impulse generation circuit to interrupt generating the control impulses.

The method 500 may also include sensing, by another temperature threshold sensor, a temperature of a board holding at least one of the following: the first sensor circuit, the second sensor circuit, the multiplying circuit, the control logic circuit, the impulse generation circuit, the transistor bridge, and the output circuit. The method 500 may also include determining, by the temperature threshold sensor, that the temperature exceeds a pre-determined threshold. In response to the determination, the method 500 may also include providing, by the temperature threshold sensor, a fault signal to the control logic circuit. Upon receiving the fault signal, the control logic circuit can be configured to interrupt generating, by the impulse generation circuit, the control impulses.

The method 500 may also include sensing, by a voltage threshold sensor, a voltage of the power source. The method 500 may include determining, by the voltage threshold sensor, that the voltage exceeds a pre-determined threshold. In response to the determination, the method 500 may include providing, by the voltage threshold sensor, a fault signal to the control logic circuit, wherein upon receiving the fault signal, the control logic circuit is configured to interrupt generating, by the impulse generation circuit, the control impulses.

Thus, the discharge power supplies for providing a stabilized discharge power for Hall-effect thrusters have been described. Although embodiments have been described with reference to specific example embodiments, it will be evident that various modifications and changes can be made to these example embodiments without departing from the broader spirit and scope of the present document. Accordingly, the specification and drawings are to be regarded in an illustrative rather than a restrictive sense.

What is claimed is:

1. A discharge power supply (DPS) for providing a stabilized discharge power to a Hall-effect thruster, the DPS comprising:
 a first sensor circuit configured to sense, based on a discharge power, a voltage sense signal;
 a second sensor circuit configured to sense, based on the discharge power, a current sense signal;
 a multiplying circuit configured to multiply the voltage sense signal and the current sense signal to generate a feedback signal;
 a control logic circuit configured to receive control signals and generate further control signals;

an impulse generation circuit configured to generate, based on the further control signals and the feedback signal, control impulses;
a transistor bridge, configured to produce, using the control impulses and a power source, electrical impulses; and
an output circuit configured to modify the electrical impulses to generate the stabilized discharge power.

2. The DPS of claim 1, wherein the voltage sense signal is proportional to a voltage of the discharge power and the current sense signal is proportional to a current of the discharge power.

3. The DPS of claim 1, wherein the output circuit includes:
a transformer configured to transform the electrical impulses;
a rectifier configured to rectify impulses of the transformed electrical impulses to produce rectified impulses; and
an output filter configured to filter the rectified impulses to generate the stabilized discharge power.

4. The DPS of claim 3, further comprising a temperature threshold sensor configured to:
sense a temperature of the transformer;
determine that the temperature exceeds a pre-determined threshold; and
in response to the determination, provide a fault signal to the impulse generation circuit to interrupt generating the control impulses.

5. The DPS of claim 1, further comprising:
a first normalizing amplifier configured to amplify the voltage sense signal prior to the voltage sense signal being provided to the multiplying circuit; and
a second normalizing amplifier configured to amplify the current sense signal prior to the current sense signal being provided to the multiplying circuit.

6. The DPS of claim 1, further comprising a temperature threshold sensor configured to:
sense a temperature of a board holding at least one of the following: the first sensor circuit, the second sensor circuit, the multiplying circuit, the control logic circuit, the impulse generation circuit, the transistor bridge, and the output circuit;
determine that the temperature exceeds a pre-determined threshold; and
in response to the determination, provide a fault signal to the control logic circuit, wherein upon receiving the fault signal, the control logic circuit is configured to interrupt generating, by the impulse generation circuit, the control impulses.

7. The DPS of claim 1, further comprising an input voltage threshold sensor configured to:
sense a voltage of the power source;
determine that the voltage exceeds a pre-determined threshold; and
in response to the determination, provide a fault signal to the control logic circuit, wherein upon receiving the fault signal, the control logic circuit is configured to interrupt generating, by the impulse generation circuit, the control impulses.

8. The DPS of claim 1, further comprising a discharge voltage threshold sensor configured to:
determine that the voltage sense signal exceeds a pre-determined threshold; and
in response to the determination, provide a fault signal to the multiplying circuit, wherein upon receiving the fault signal, the multiplying circuit is configured to interrupt generating the feedback signal.

9. The DPS of claim 1, further comprising a discharge current threshold sensor configured to:
determine that the current sense signal exceeds a pre-determined threshold; and
in response to the determination, provide a fault signal to the multiplying circuit, wherein upon receiving the fault signal, the multiplying circuit is configured to interrupt generating the feedback signal.

10. The DPS of claim 1, wherein the control signals are provided by a control panel of a space apparatus driven by the Hall-effect thruster.

11. The DPS of claim 1, wherein the control signals include on/off signals and a desired level of the stabilized discharge power.

12. The DPS of claim 1, wherein the voltage sense signal and the current sense signal are provided to a control panel of a space apparatus driven by the Hall-effect thruster, the control panel being configured to generate, based on the voltage sense signal and the current sense signal, telemetric signal indicative of a state of the Hall-effect thruster.

13. A method for providing a stabilized discharge power to a Hall-effect thruster, the method comprising:
sensing, by a first sensor circuit and based on a discharge power, a voltage sense signal;
sensing, by a second sensor circuit and based on the discharge power, a current sense signal;
multiplying, by a multiplying circuit, the voltage sense signal and the current sense signal to generate a feedback signal;
generating, by a control logic circuit and based on control signals, further control signals;
generating, by an impulse generation circuit and based on the further control signals and the feedback signal, control impulses;
producing, by a transistor bridge and using the control impulses and a power source, electrical impulses; and
modifying, by an output circuit, the electrical impulses to generate the stabilized discharge power.

14. The method of claim 13, wherein the voltage sense signal is proportional to a voltage of the discharge power and the current sense signal is proportional to a current of the discharge power.

15. The method of claim 13, wherein the output circuit includes:
a transformer configured to transform the electrical impulses;
a rectifier configured to rectify impulses of the transformed electrical impulses to produce rectified impulses; and
an output filter configured to filter the rectified impulses to generate the stabilized discharge power.

16. The method of claim 15, further comprising:
sensing, by a temperature threshold sensor, a temperature of the transformer;
determining, by the temperature threshold sensor, that the temperature exceeds a pre-determined threshold; and
in response to the determination, providing, by the temperature threshold sensor, a fault signal to the impulse generation circuit to interrupt generating the control impulses.

17. The method of claim 13, further comprising:
amplifying, by a first normalizing amplifier, the voltage sense signal prior to the voltage sense signal being provided to the multiplying circuit; and amplifying, by a second normalizing amplifier, the current sense signal prior to the current sense signal being provided to the multiplying circuit.

18. The method of claim 13, further comprising: configured to:

sensing, by a temperature threshold sensor-f, a temperature of a board holding at least one of the following: the first sensor circuit, the second sensor circuit, the multiplying circuit, the control logic circuit, the impulse generation circuit, the transistor bridge, and the output circuit;

determining, by the temperature threshold sensor, that the temperature exceeds a pre-determined threshold; and in response to the determination, providing, by the temperature threshold sensor, a fault signal to the control logic circuit, wherein upon receiving the fault signal, the control logic circuit is configured to interrupt generating, by the impulse generation circuit, the control impulses.

19. The method of claim 13, further comprising:

sensing, by a voltage threshold sensor, a voltage of the power source;

determining, by the voltage threshold sensor, that the voltage exceeds a pre-determined threshold; and in response to the determination, providing, by the voltage threshold sensor, a fault signal to the control logic circuit, wherein upon receiving the fault signal, the control logic circuit is configured to interrupt generating, by the impulse generation circuit, the control impulses.

20. A discharge power supply (DSP) for providing a stabilized discharge power-to a Hall-effect thruster, the DSP comprising:

a first sensor circuit configured to sense, based on a discharge power, a voltage sense signal;

a second sensor circuit configured to sense, based on the discharge power, a current sense signal;

a multiplying circuit configured to multiply the voltage sense signal and the current sense signal to generate a feedback signal;

a control logic circuit configured to receive control signals and generate further control signals;

an impulse generation circuit configured to generate, based on the further control signals and the feedback signal, control impulses;

a transistor bridge, configured to produce, based on the control impulses and using a power source, electrical impulses;

a transformer configured to transform the electrical impulses;

a rectifier configured to rectify impulses of the transformed electrical impulses to produce rectified impulses; and an output filter configured to filter the rectified impulses to generate the stabilized discharge power.

* * * * *